US005707688A

United States Patent [19]

Batzar et al.

[11] Patent Number: 5,707,688
[45] Date of Patent: Jan. 13, 1998

[54] MULTI-COLOR PATTERNED COOKWARE

[75] Inventors: Kenneth Batzar, Cherry Hill, N.J.; Lori Marie Mason, North Wales, Pa.

[73] Assignee: E. I. Du Pont de Nemours and Company, Wilmington, Del.

[21] Appl. No.: 482,373

[22] Filed: Jun. 7, 1995

Related U.S. Application Data

[63] Continuation-in-part of Ser. No. 362,090, Dec. 22, 1994, abandoned.

[51] Int. Cl.$^6$ .............................. B05D 1/38; B05D 5/02; B05D 2/02
[52] U.S. Cl. .................. 427/258; 427/265; 427/267; 427/287; 428/422
[58] Field of Search ............................. 427/258, 265, 427/267, 287, 385.5; 428/420, 422

[56] References Cited

U.S. PATENT DOCUMENTS

| | | | |
|---|---|---|---|
| 3,655,421 | 4/1972 | Long | 117/45 |
| 4,169,083 | 9/1979 | Vassiliou | 260/23 |
| 4,259,375 | 3/1981 | Vassiliou | 427/267 |
| 4,311,634 | 1/1982 | Vassiliou | 260/42.27 |
| 4,353,950 | 10/1982 | Vassiliou | 428/195 |
| 4,677,000 | 6/1987 | Gavdaz et al. | 427/261 |
| 4,711,802 | 12/1987 | Tannenbaum | 428/207 |
| 5,233,358 | 8/1993 | Yamada et al. | 430/18 |
| 5,240,775 | 8/1993 | Tannenbaum | 428/422 |
| 5,250,356 | 10/1993 | Batzar | 428/421 |

FOREIGN PATENT DOCUMENTS

| | | |
|---|---|---|
| 0 022 256 | 7/1980 | European Pat. Off. . |
| 285 161 | 2/1992 | European Pat. Off. . |
| 2 594 673-A3 | 8/1987 | France . |
| 1 572 842 | 8/1980 | United Kingdom . |
| 2 174 315 | 11/1986 | United Kingdom . |

OTHER PUBLICATIONS

International Search Report for PCT/ US 95/15793 filed Dec. 6, 1995.

*Primary Examiner*—Strive Beck
*Assistant Examiner*—Fred J. Parker

[57] ABSTRACT

Cookware with a multi-layer, non-stick coating on its cooking surface has a random spattered pattern of raised dots or globules in an inner coat, which is applied by spraying at least two applications, with the first having more coverage and a darker color than the second.

11 Claims, No Drawings

MULTI-COLOR PATTERNED COOKWARE

CROSS REFERENCE TO RELATED APPLICATIONS

This is a continuation-in-part of application Ser. No. 08/362,090 filed Dec. 22, 1994 abandoned.

BACKGROUND OF THE INVENTION

This invention concerns non-stick coated cookware, with a decorative pattern visible through a light transmitting topcoat. More specifically, it concerns such cookware with a pattern formed by discontinuous globules.

U.S. Pat. No. 4,259,375—Vassiliou (1981) discloses an article of cookware with a 3-layer coating having a discontinuous speckled or spattered pattern in a partial layer directly beneath the topcoat. The spattered coating is deliberately sprayed directly on the layer under it while the under layer is still wet and soft so that the spattered layer sinks into the under layer and does not provide roughness that could telegraph through the surface. It was said that roughness would provide a place for a fork or other utensil to catch in the coating and tear the coating. The spattered layer dots were also sprayed on directly, such as at 90 degrees from the substrate, so as to form more or less round dots. This patent is incorporated by reference herein for its disclosure of materials, processes and equivalents suitable for the present invention.

U.S. Pat. No. 3,951,993—Palisin (1975) discloses spraying multilayer polymer coatings on a substrate, one layer being sprayed on top of the layer under it after the under layer has become tacky. A tacky underlayer permits the successive layer to adhere better without completely merging indistinguishably with the underlayer. Still, any roughness in the upper layer would tend to smooth out as the two layers interact.

U.S. Pat. No. 3,655,421—Long (1972) describes means of keeping globules of an intermittent coating from flowing out to make a uniform layer, by controlling surface tension relations.

It is desirable to have a superior non-stick, decorative coating for cookware optionally with a raised or textured surface and with greater flexibility for aesthetic design than just to make smooth round dots.

SUMMARY OF THE INVENTION

The present invention provides an article of cookware and a method of making it, having a cooking surface which comprises a multi-layer, non-stick coating on a substrate which coating minimizes sticking by food residues and which is heat resisting by being stable at temperatures above 300° C., wherein the coating comprises a primer adhered to the substrate, a non-stick, heat-resisting, light-transmitting topcoat, and optionally one or more intermediate coats, with the topcoat adhered to any such intermediate coats which are adhered to the primer, or in the absence of intermediate coats, the topcoat being adhered directly to the primer, with the coating under the topcoat having a first color or darkness, wherein a discontinuous layer of globules is present on or in and covers no more than 80% of the area of the coating under the topcoat, said globules having at least one color or darkness which is visibly different than said first color or darkness as seen through said topcoat, said discontinuous layer is applied by at least two applications of globules, with the first application covering 30-80% of the area and the second application covering 20-45% of the area, with the second application covering at least 5% less area than the first.

Included in the invention are a method of making an article in which the coatings are applied by spraying coating compositions successively on the substrate and ultimately heating the article to cure the coating, wherein the coating under the discontinuous coating is dried enough before applying the discontinuous coating so that substantial portions of the spattered coating remains on top of said under coating to create the roughness telegraphing through the topcoat. In another alternative the undercoat is not dried before applying the discontinuous coat which then sinks into the undercoat, resulting in a substantially smooth topcoat.

DETAILED DESCRIPTION

One embodiment of the process for obtaining the present invention is the drying or "flashing" the primer or intermediate coat before applying the discontinuous coat, adequately so the spattered dots do not sink into the primer or the intermediate coat. In normal application, air flow for 30 seconds or longer, or preheating the substrate or the air with a shorter time of air flow, will suffice.

In another embodiment, the globules can be applied wet-on-wet and permitted to sink into the underlayer so long as they do not merge and lose their distinctiveness.

Those skilled in the art know how to select the ingredients of each coating to avoid wetting which might cause the globules to run together. Wetting is generally not a problem with most heat resistant materials useful for cookware coatings, especially perfluoropolymers such as polytetrafluoroethylene and (PTFE) and copolymers of TFE and fluorovinyl ethers (PFA).

Preferably the coatings contain oxide-coated mica, and preferably the oxide in $TiO_2$, as described in U.S. Pat. No. 3,087,827—Klenke et al., U.S. Pat. No. 3,087,828 and 3,087,829—both to Linton, and granted 1963.

In the examples which follow, parts, percentages and proportions are given by weight except where stated otherwise.

EXAMPLE 1

A primer having the composition of Table 1 is sprayed on a clean, lightly etched aluminum substrate to a dry film thickness (DFT) of 7.5 to 10 microns, the primer is dried at 66° C. for 3 minutes and a black midcoat of Table 2 is applied to a DFT of 17.5 to 20 microns. The midcoat is allowed to dry at ambient temperature for 45 seconds and three separate inks or spatter coatings are applied using a DeVilbiss spatter gun to provide a discontinuous coating. The inks of Table 3 or 4 are colored to be significantly different than the black midcoat background and are sprayed at a 45° angle (or at an angle of from 30° to 75°) to provide irregular shapes on the spinning substrate. The effect is to provide an appearance of natural stone. The inks are not limited to solid color pigments but also include color achieved by reflectance with coated mica. A topcoat of Table 4 is then applied wet-on-wet over the spattered particles. The topcoat, in this example, contains mica particles in a 1–15 micron particle size range so as not to interfere with the aesthetics of the spatter coat. The entire system is sintered at 427° to 435° C. for 5 minutes with the measured temperatures being that of the substrate metal.

TABLE 1

| Primer | Coating Composition (Wt. %) | Solids Content in Finished Article (Wt %) |
|---|---|---|
| Furfuryl Alcohol | 1.82 | — |
| Polyamic acid salt in N-Methyl Pyrrolidone | 18.10 | 24.48 |
| Water | 48.33 | — |
| Mica coated with TiO$_2$ | 0.05 | 0.24 |
| PTFE Dispersion | 7.93 | 22.19 |
| FEP Dispersion | 5.88 | 15.08 |
| Colloidal Silica Dispersion | 3.58 | 5.00 |
| Ultramarine blue dispersion | 13.74 | 32.06 |

TABLE 1-continued

| Primer | Coating Composition (Wt. %) | Solids Content in Finished Article (Wt %) |
|---|---|---|
| Aluminum silicate dispersion | 0.58 | 0.94 |

TABLE 2

| Intermediate | Coating Composition (Wt. %) | Solids Content in Finished Article (Wt %) |
|---|---|---|
| PTFE Dispersion | 56.34 | 77.43 |
| PFA Dispersion | 10.21 | 14.22 |
| Water | 4.62 | — |
| Carbon black dispersion | 2.71 | 3.79 |
| Ultramarine blue dispersion | 0.49 | 3.22 |
| Mica coated with TiO$_2$ | 0.75 | 1.73 |
| Surfactant catalyst soln. | 12.63 | — |
| Acrylic dispersion | 12.23 | — |

TABLE 3

Typical spatter ink formulation compositions (parts by weight)

| | A (white) | B (gray) | C (brown) |
|---|---|---|---|
| PTFE Dispersion | 542.0 | 542.0 | 542.0 |
| PFA Dispersion | 96.0 | 96.0 | 96.0 |
| Ceramic Dispersion | 50.0 | 50.0 | — |
| TiO$_2$ Dispersion | 100.0 | 100.0 | 20.0 |
| Iron Oxide Dispersion | — | — | 80.00 |
| Channel Black Dispersion | — | 8.0 | 2.0 |
| Solvent Surfactant Blend | 110.00 | 110.00 | 110.00 |
| Acrylic Dispersion | 120.00 | 120.00 | 120.00 |
| Solvent-Surfactant Blend | 30.00 | 30.00 | 30.00 |
| Hydroxyl propl cellulose soln. | 30.00 | 15.00 | 20.00 |
| Viscosity in centipoise as measured by Brookfield #2 spindle, @ 20 rpm | 682 | 608 | 682 |

TABLE 4

| | White | | Gray | |
|---|---|---|---|---|
| Spatter Coats | Coating Composition (Wt. %) | Solids Content in Finished Article (Wt. %) | Coating Composition (Wt. %) | Solids Content in Finishes Article (Wt. %) |
| PTFE Dispersion | 50.29 | 71.04 | 50.61 | 70.63 |
| PFA Dispersion | 8.91 | 12.58 | 8.96 | 12.52 |
| Al$_2$O$_3$ Ceramic Dispersion | 4.64 | 5.46 | 4.67 | 5.43 |
| TiO$_2$ Dispersion | 9.28 | 10.92 | 9.34 | 10.86 |
| Carbon black Dispersion | — | — | 0.75 | 0.52 |
| Surfactant-Catalyst Solution | 12.99 | — | 13.07 | — |
| Acrylic Dispersion | 11.13 | — | 11.20 | — |
| Hydroxyl propyl cellulose soln. | 2.78 | — | 1.40 | — |
| Viscosity in centipoise as measured by Brookfield #2 spindle, @ 20 rpm | 682 | | 608 | |

TABLE 5

| Topcoat | Coating Composition (Wt. %) | Solids Content in Finished Article (Wt %) |
|---|---|---|
| PTFE Dispersion | 66.73 | 94.04 |
| PFA Dispersion | 3.51 | 4.95 |
| Water | 3.77 | — |
| Mica coated with TiO$_2$ | 0.43 | 1.01 |
| Surfactant catalyst soln. | 12.52 | — |
| Acrylic dispersion | 13.04 | — |

In order to achieve a stone-like appearance, we prefer to spray a first discontinuous coat of a relatively darker color or optical density than the second as well as each successive globule coat being of a progressively lighter color or darkness. One preferred combination is to have a black base coat (the intermediate on which the discontinuous globule coats are to be sprayed) with the first globule coat in a dark brown, the second globule coat in a lighter gray, and an optional third globule coat in white.

It is important, for achieving the desired aesthetic flexibility, to have more complete coverage with the first globule coat and progressively less complete coverage with each successive globule coat, in accordance with the following:

TABLE 6

| Globule Coat | % of area | |
|---|---|---|
| | Range of Coverage | Preferred Range |
| First | 30–80 | 45–65 |
| Second | 20–45 | 30–40 |
| Optional Third | 10–35 | 15–30 |

There should be at least a 5% difference in area covered between each globule coat. Thus, if the first coat covers 40%, the second should cover no more than 35% and then the third no more than 30%.

The spray is preferably done from a spatter gun, resulting in random coverage and more or less overlap of the globules of one application by those of the next application.

We claim:

1. A method of making an article of cookware having a cooking surface which comprises a multi-layer, non-stick fluoropolymer coating on a substrate which coating minimizes sticking by food residues and which is heat resisting by being stable at temperatures above 300° C., wherein the multi-layer fluoropolymer coating comprises (1) a fluoropolymer primer coating adhered to the substrate, (2) a non-stick, heat-resisting, light-transmitting fluoropolymer topcoat coating, and (3) at least one optional fluoropolymer intermediate coating, said primer coating or said at least one fluoropolymer intermediate coating when it is present, having a first color or darkness, said method comprising; spraying at least two applications of globules as a discontinuous fluoropolymer coating onto the primer coating or optional at least one fluoropolymer intermediate coating when it is present, said globules having at least one color or darkness which is visibly different than said first color or darkness in said primer coating or said optional at least one fluoropolymer intermediate coating to which said discontinuous coating is applied as seen through said topcoat, with a first application of globules covering 30–80% of an area of said primer coating or said optional at least one fluoropolymer intermediate coating to which said first application is applied and a second application of globules covering 20–45% of the same area as said first application, with the second application covering at least 5% less area than the first.

2. The method of claim 1 wherein a third application is sprayed to a coverage of 10–35%, with the third application covering at least 5% less area than the second.

3. The method of claim 1 wherein the first application coverage is in the range of 45–65% and the second application coverage is in the range of 30–40%.

4. The method of claim 3 wherein the third application coverage is in the range of 15–30%.

5. The method of claim 1 wherein the globules contain $TiO_2$-coated mica.

6. A method of claim 1 in which the coatings are applied by spraying coating compositions successively on the substrate and ultimately heating the article to cure the coating, wherein either the primer coating or optional at least one fluoropolymer intermediate coating under the discontinuous coating is partially dried before applying the discontinuous coating so that substantial portions of the globules in the discontinuous coating remain on top of said under coating to create a texture or roughness in the topcoat.

7. A method of claim 1 wherein the discontinuous coating is sprayed on either the primer coating or optional at least one fluoropolymer intermediate coating while said primer coating or said optional at least one fluoropolymer intermediate coating if present is still wet enough so that the globules sink into said primer coating or said optional at least one fluoropolymer intermediate coating and the final topcoat is substantially smooth.

8. The method of claim 1 in which the discontinuous coating is sprayed onto the primer coating or optional at least one fluoropolymer intermediate coating if present at an angle such that the center of the spray stream relative to the substrate is in the range of 30 to 75 degrees, creating a spattered pattern of non-round globules.

9. The method of claim 8 wherein the angle is in the range of 45 to 60 degrees.

10. The method of claim 8 wherein each successive globule application is of a lighter color or darkness than the preceding globule application.

11. An article of cookware made by the method of claim 1.

* * * * *